J. F. BARRETT.
Operating Harvester Cutters.
No. 2,611. Reissued May 14, 1867.
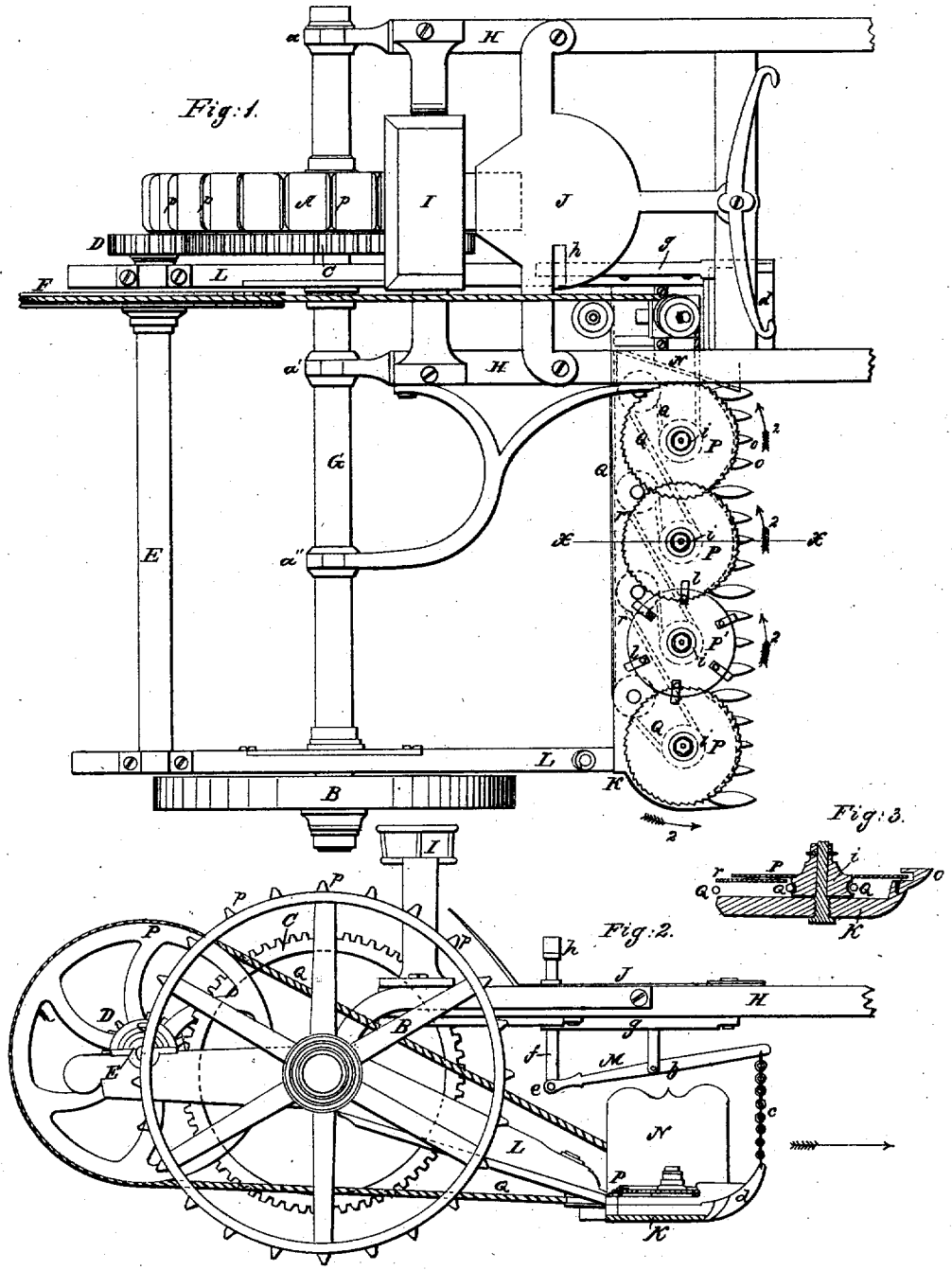
Witnesses:
Willard D. Gay
William B. Libbitt
Inventor:
Jonathan F. Barrett
N. PETERS, Photo-Lithographer, Washington, D. C.

UNITED STATES PATENT OFFICE.

C. WHEELER, JR., OF AUBURN, NEW YORK, ASSIGNEE, BY MESNE ASSIGNMENTS, OF JONATHAN F. BARRETT.

IMPROVED METHOD OF RAISING AND LOWERING THE CUTTERS OF HARVESTERS.

Specification forming part of Letters Patent No. 13,205, dated July 10, 1855; reissue No. 2,611, dated May 14, 1867.

*To all whom it may concern:*

Be it known that I, JONATHAN F. BARRETT, of the town of North Granville, county of Washington, State of New York, have invented certain new and useful Improvements in Mowing and Reaping Machines; and I do hereby declare the following to be a full, clear, and exact description of my said invention, reference being had to the accompanying drawings, and to the letters of reference marked thereon, and making a part of this specification, in which—

Figure 1 is a plan of the machine. Fig. 2 is a side elevation. Fig. 3 is a vertical section on the line *x x*.

Like characters of reference in the several figures denote like parts of the machine.

The nature of my invention consists in the arrangement of the driver's seat, frame, and cutting apparatus with reference to each other, together with the method of attaching the team to the machine, the object being to secure to the driver great facility in controlling and directing his team, while the cutters can freely rise above or fall below the plane over which the supporting-wheels are passing, the driver's seat preserving its position uninfluenced by the up-and-down motions of the cutting apparatus; and, also, so arranging the same that the driver can, with great ease, raise the cutters to pass obstacles in the path of the machine.

To enable others to make and use my invention, I will proceed to describe the same with reference to the drawings.

Upon the axle G are mounted the two supporting-wheels A and B, of equal, or nearly equal, diameters, the wheel A being furnished with projections *p p*, the object of these projections being to take hold of the ground over which the wheel is drawn, to prevent it from dragging on the ground, and thereby insure to it a rotary motion about the axle G whenever the machine is moved over the ground. The wheel B also turns freely upon the axle G. The wheel A is furnished with a cog-wheel, C, which is rigidly connected to it, and, of course, partakes of the motion of the wheel A, and which, by means of devices hereinafter described, communicates motion to the cutters. At a suitable place, inside of and near to the two wheels A and B, is secured to the axle G, by means of an eye, the sides L L of the frame of the machine. The sides L L of the frame extend forward of the front face of the wheels A and B, and are connected together by the finger-bar K, which supports the cutters, and this finger-bar forms the front part of the frame. The rear ends of the side pieces L extend beyond the rear faces of the wheels A and B, and in a suitable place are connected by a shaft, E, this shaft forming the rear part of the frame of the machine. Upon the shaft E, and rigidly connected therewith, is the pinion D, which engages with and is turned by the main cog-wheel C. Inside of the side pieces L nearest the wheel A, and upon the shaft E, is mounted the scored pulley F, which, by means of the belt or cord Q, gives motion to a system of rotary cutters, P, P, P′, and P, placed upon the finger-bar. These cutters, when set in motion by the forward motion of the machine through the rotation of the wheel A, pinion D, and wheel F, and the movements of the band K, sever the stalks of grass or grain against the fingers O O O upon the finger-beam. The draft-frame, by which the machine is drawn, is attached to the main axle, the connection being made to said axle by a hinge or pivot, in such a way as that the rear end of said connection may turn freely on the said axle. It is so connected, also, as to allow the path of the team to be entirely outside of the standing crop, in order to prevent the trampling down of the crop by the advancing team. The thills H, in the drawings, represent a portion of the draft-frame. The driver's seat I is placed upon the draft-frame, with a foot-board, J. The end of the finger-bar K nearest the team is provided with a metallic shoe-piece, *d*, which curves upward at its forward end, to enable the cutters more readily to pass over any loose grass that may lie in its path. The front upper portion of this shoe is connected by a flexible cord or chain, *c*, to the front end of the lever M, which lever is hung beneath the thills, and is movable about its fulcrum *b*, and its rear arm attached by a joint, *e*, to the rod *f*. The rod *f* passes through the bar *g* and foot-board J, and has on its upper extremity a cross-piece, *h*, for the reception of the driver's foot. The chain *c* may be adjusted in length, so as to control the cutting apparatus in its downward movement within any desired limit.

The vertical side guard N prevents the falling grass from entangling the band Q. The slotted guard-teeth O are secured to the front edge of the finger-bar K, and are made of different lengths, to conform to the curvature in the finger-bar corresponding to the periphery of the same, and also to bring their points in the same right line. P P′ are rotary cutters, secured to pulleys *i*, as shown in Fig. 1, and are set in motion by the forward movement of the machine, as before described.

The operation of the machine is as follows: The machine is driven forward in the usual manner, the projections *p* on the wheel A insuring the rotation of the band-wheel F, as indicated by arrow 1, producing, through band Q, the revolution of each of the series of cutters P P′, as indicated by arrows 1 2. The revolution of the cutters cuts the grass against the fingers, the mown grass passing off in rear over the plate *r*. During the operation of the machine the finger-bar K rests upon the shoe *d*, which shoe rests upon and glides over the surface of the ground; and should the finger-bar and cutting apparatus thereto attached meet with either furrow or ridge in its path, it would, by reason of its being pivoted through the side pieces L L upon the main axle, drop down or rise up, as circumstances may require, independent of the position of the wheels A and B, within the limit allowed by the flexible connection between the draft-frame and the shoe *d*; and in case a fixed obstruction should occur in the path of the machine, like a stump or a fixed stone, the driver in his seat can, by means of the lever, immediately raise the cutters over the obstruction, and thereby prevent injury to the cutters; and it will be noticed, further, that the wheels A and B, and the side pieces L L, upon which the shaft E is mounted, having a common center of motion, the cog-wheel C and pinion D will always be engaged, so as to impart constant motion to the cutters, whether the machine is drawn over a perfectly plain surface, or over an uneven surface, even should the frame of the machine be constantly tilted up and down upon the axle. It will be noticed, also, that the tilting motion of the frame does not influence in the least the driver's seat, which is controlled by the draft-frame. If the driver's seat were mounted on the frame that carries the cutters he would be influenced by its tilting motion, and it would be difficult to preserve a proper balance of the frame and cutting apparatus. It would also be difficult for the driver to control the cutting apparatus in passing obstructions. It will also be observed that the position of the driver relatively to the cutting apparatus (which moves in advance of him) is such that he can watch the cutters and guard against obstructions, and, at the same time, his position is one of ease and safety.

The machine herein described is more particularly designed for mowing grass; but the same construction, with slight modifications, is equally applicable to harvesting grain.

Having thus fully described the nature, object, and purpose of my invention, what I claim therein as new, and desire to secure by Letters Patent, is—

1. The combination of the frame carrying the cutting apparatus, vibrating about a gear-center, and the vibrating draft-frame.

2. The combination of the frame carrying the cutting apparatus, vibrating about a gear-center, with a vibrating draft-frame and the lever, or its equivalent, for raising and lowering the cutting apparatus attached to said draft-frame.

3. The combination of the draft-frame attached directly to the axle of the driving-wheels with a frame carrying the cutting apparatus vibrating about a gear-center.

4. The combination of a vibrating draft-frame, a frame carrying the cutting apparatus vibrating about a gear-center, and a driver's seat attached to said draft-frame.

JONATHAN F. BARRETT.

Witnesses:
W. GAY,
WILLIAM B. TIBBITS.